United States Patent Office 2,981,595
Patented Apr. 25, 1961

2,981,595
RECOVERY OF TELLURIUM

Sidney B. Tuwiner, Baldwin, N.Y., assignor to Phelps Dodge Corporation, New York, N.Y., a corporation of New York No Drawing. Filed Oct. 27, 1958, Ser. No. 769,555

9 Claims. (Cl. 23—50)

This invention relates to recovery of tellurium from anode slimes produced in the electrolytic refining of copper.

Speaking generally regarding the electrolytic refining of copper, an electrolytic cell is provided with an anode of impure copper, a cathode of substantially pure copper and an electrolyte comprising a solution of copper sulfate and sulfuric acid. When a direct electrical current is passed between the anode and cathode in such a cell the impure copper dissolves in the electrolyte and pure copper is plated onto the cathode. During the refining operation a sludge or slime is deposited in the bottom of the cell. This slime is composed of impurities from the copper anode, including, as a rule, significant amounts of selenium, tellurium, copper, lead, silica, gold and silver and lesser amounts of nickel, tin, arsenic and antimony. The selenium and tellurium content of the anode slimes s chiefly in the form of the selenides and tellurides of copper, silver and gold.

This invention provides a method for recovery of the tellurium from the anode slimes, and more particularly to the separation of tellurium from certain residual products formed in the practice of certain steps in the process of separating the selenium content from the anode slimes.

In one method I have employed in recovering metal values, and more particularly, selenium, from anode slimes (described in my copending patent application Serial No. 680,393), the slimes are mixed with sodium carbonate to form a paste which is extruded and formed into a macro-porous bed of micro-porous masses. The macro-porous bed is dried and roasted at a temperature near to, but below the fusion temperature of the dried mixture of slimes and sodium carbonate. As a result of the roasting operation the selenium is oxidized to water-soluble state, metallic copper is oxidized to cupric oxide and metallic tellurium is oxidized to tellurous oxide and other lesser metals present in the slimes, such as arsenic, lead, and silica, are oxidized. The roasted product is treated with water. This forms a liquor in which the water-soluble selenium is dissolved and a residue (herein for convenience called a "first" residue) containing gold and silver and oxides of the metals present in the slimes. This slurry is filtered. The filtrate contains the selenium. The "first" residue, just mentioned, contains the gold and silver and oxides of tellurium, copper and other metals in minor amounts. The filtrate may be treated to recover the selenium as described in my said patent application. The "first" residue containing tellurium and other above mentioned metals in oxide form is treated, in accordance with the present invention, for the recovery of tellurium.

The residue just mentioned, which may be in the form of filter cake, contains, in addition to tellurium in oxide form, all of the metals contained in the slime from the electrolytic copper refinery excepting only selenium which has been removed by a selenium recovery process, such, for example, as mentioned above. These metals in the "first" residue would include copper, present in the form of cupric oxide as a result of the oxidizing roast which is a part of the selenium extraction process; tellurium in the form of tellurous oxide; and minor amounts of arsenic, antimony, lead and silica as oxides; and also the precious metals, gold and silver.

The purpose of roasting the slimes-sodium carbonate mixture in the selenium recovery process mentioned above, is not only to convert the selenium in the slimes to the water-soluble state, but also to oxidize metallic copper to cupric oxide and tellurium to tellurous oxide. Both of these metals are thereby rendered acid-soluble.

In accordance with the process of this invention, the "first" residue containing tellurium oxide, copper oxide, gold and silver, and minor amounts of oxides of other metals present in the slimes, is digested with sulfuric acid. This converts the copper and tellurium into sulfates. Preferably, the process is conducted in such a way that sulfuric acid is added to a slurry of the telluruim and copper-bearing material with agitation at a temperature of at least 160° F. With sufficient acid the dissolution of copper and tellurium is substantially completed within a period of an hour. The product of this acid digestion is filtered and this separates the liquor containing copper and tellurium in the form of sulfates from the solid residue which contains the precious metals and other values. This residue is herein, for convenience of description, called the "second" residue. The precious metals and other metal values may be recovered from this second residue by known methods. The filtered liquor containing the copper and tellurium in sulfate form is then treated with metallic copper, to form a tellurium-copper cementation product, sometimes referred to herein as the "third" residue. Shotted blister copper, copper wire, and other forms of copper presenting a large or extended surface area are suitable for this purpose. Preferably, finely divided copper powder is used. Under suitable conditions of temperature and agitation it reacts within a period of one hour to reduce the tellurium content of the acid liquor substantially completely, while precipitating finely divided metallis tellurium as a copper-tellurium cementation product. Small amounts of metallic silver which are sometimes dissolved with the copper and tellurium are precipitated with the metallic tellurium, and the acidic liquor is a solution of copper sulfate, substantially free of metallic impurities, and therefore is suitable for the production of copper sulfate. Sufficient metallic copper is added to react at least with all the tellurium present.

The cementation product after filtration and separation from the sulfate liquor is then treated for the separation and recovery of tellurium from the gold, silver and copper values. The filter cake or residue from the filtration step is charged into a suitable furnace and subjected to a smelting operation using sodium carbonate as a flux. Sodium or potassium hydroxide, sodium or potassium nitrate, or alkali or alkali-yielding compounds or materials may be used as the fluxing material. By subjecting the tellurium cementation product and at least an equivalent amount of soda flux to a smelting operation at a temperature of approximately 2200° F. under oxidizing conditions, there is a separation of the charge into two slag layers. The top layer of slag (herein for convenience referred to as the tellurium-containing slag layer) is composed of sodium tellurite dissolved in an excess of flux with only minor amounts of other values. The bottom slag layer is rich in copper, as cuprous oxide, and precious metals and also contains most of the selenium which had not theretofore been extracted in the initial process directed to extraction of selenium from the anode slimes; the cuprous oxide slag acting as a collector for the precious metals and also selenium, if present in the charge. The two layers may be drawn off separately.

The bottom layer slag may, if desired, be treated for recovery of the precious metals or other values, or, it may be used as a revert material for a copper smelter or copper anode furnace and the precious metals and other values recovered in a subsequent cycle. The upper or tellurium-containing slag will contain the tellurium in the form of sodium tellurite in an excess of the soda flux and this slag will be substantially free of other metals or impurities. Consequently the tellurium may be recovered from the slag material by known methods.

Although the novel features which are believed to be characteristic of the invention are pointed out in the annexed claims, the invention itself as to its objects and advantages and the manner in which it may be carried out may be better understood from the following more detailed description as set forth by way of specific example.

As an illustration of the manner in which this invention may be carried into practice, 14,158 pounds of filter cake was obtained from water-leaching of a roasted mixture of anode slimes and sodium carbonate. That is, in a process for recovery of selenium from anode slimes, anode slimes were mixed with a stoichiometric amount of sodium carbonate and treated as disclosed in my copending application for U.S. Patent Serial No. 680,393 for a process for the recovery of selenium from electrolytic copper refinery slimes. The mixture of slimes was made into a paste which was extruded to form a macro-porous bed of micro-porous masses. The bed was dried and roasted at a temperature below the fusion temperature of the mixture. This roasted product was leached with water to dissolve the water-soluble selenium. The slurry was filtered. The filtrate containing the water-soluble selenium was treated for the recovery of selenium. The filter cake contained tellurium in the form of tellurous oxide and some arsenic, antimony, lead and silica as oxides and also the precious metals, gold and silver. This filter cake, for convenience of description, is herein called the "first" residue. It is a filter cake comprising the residue from the leached roasted mixture of anode slimes and sodium carbonate.

The 14,158 pounds of filter cake charge ("first" residue) was mixed with water and 5,878 pounds of 66° Bé. sulfuric acid to produce a slurry volume of 3,540 gallons. The dry weight of the filter cake was 10,754 pounds, and the material was treated in twenty-two batches in a lead-lined tank of 250 gallon capacity, equipped with a motor-driven agitator. After one hour of agitation the dissolution of the copper and tellerium (in oxide form in the filter cake and now in sulfate form in the sulfuric acid solution) was found to be substantially completed.

The soluble components of the acidic slurry were removed by three successive thickening and repulping operations with fresh water in order to extract the water-soluble tellurium and copper values. The residue, or insoluble components, (herein for convenience of description called the "second" residue) was separated from the filtrate by filtration in a plate and frame filter press. This so-called "second" residue contained 745.96 ounces of gold, 25,235.22 ounces of silver, and 103 pounds of copper, 55 pounds of selenium and 28 pounds of tellurium. It was treated for recovery of metal values in a way which has no significant bearing on the present invention. The present invention is directed to the recovery of the tellurium in the filtrate resulting from the sulfuric acid treatment of the filter cake charge. This filter cake charge (herein called the "first" residue) is the residue from the water-leached roasted slimes-sodium carbonate mixture. It contains metals of the anode slimes with the exception of the selenium which had been extracted therefrom. This acidic filtrate is herein for convenience called "the filtrate resuling from the sulfuric acid treatment of the filter cake charge."

This filtrate, containing the tellurium and copper in the form of sulfates dissolved in the aqueous acid solution resulting from the acid treatment of the filter cake was treated with 720 pounds of finely divided metallic copper by agitating the solution and finely divided copper for about one hour while maintaining its temperature at the boiling point. The treatment of the tellurium and copper-containing solution with metallic copper resulted in precipitation by cementation of the tellurium and precious metals content of the liquor; it being understood that the residue (herein referred to as the "second" residue) from the filtration of the slurry resulting from the sulfuric acid treatment of the filter cake charge contained gold, silver and other values which were not dissolved by the acid treatment. The "second" residue as mentioned above may be treated as desired for recovery of the precious metals and other values.

The cementation product (sometimes referred to herein as the "third" residue) was produced in the solution according to the following reactions.

$$4Cu + Te(SO_4)_2 \rightarrow 2CuSO_4 + Cu_2Te$$
$$Cu + Ag_2SO_4 \rightarrow CuSO_4 + 2Ag$$

The copper-tellurium cementation product ("third" residue) was removed from the solution by filtration. The clarified liquor contained 2,959 pounds of copper as copper sulfate and three pounds of selenium, but substantially free of tellurium and precious metals. This copper sulfate containing liquor was subsequently treated to produce copper sulfate.

The filter cake containing the cementation product, herein for convenience called the "third" residue, weighed 615 pounds on a dry basis and contained 10.17 ouces of gold, 123.39 ounces of silver, 221.5 pounds of copper, 16 pounds of selenium and 161 pounds of tellurium. This "third" residue was smelted with soda ash in a reverberatory furnace (18" x 36" hearth dimensions) using 232 pounds of soda ash. The smelting procedure consisted of charging the mixture of cementation product and soda ash in lots of 90 pounds. Each lot as charged was melted at a temperature of 2200° F.

Two immiscible slag layers were formed in the smelting furnace. The top layer (herein for convenience called the "tellurium-containing slag" layer) was withdrawn by tapping the furnace from time to time and at the end of the campaign the bottom slag layer was withdrawn by tapping. The top or tellurium slag was water-soluble. It contained the tellurium as sodium-tellurite and assayed 9.36 percent tellurium and contained only very minor amounts of other values. Thus it is seen that the tellurium in substantially pure form is readily recoverable from the water-soluble tellurium-containing slag by known methods. The bottom layer of slag (herein for convenience called the "revert" slag) was rich in precious metals and copper as cuprous oxide. It would constitute a suitable revert material for a copper refinery anode furnace.

From the feed charge to the reverberatory furnace assaying 36.02 percent copper, 2.62 percent selenium, 26.17 percent tellurium, 401.27 ounces per ton silver, and 33.07 ounces per ton gold, there was obtained 797 pounds of tellurium slag assaying 0.09 percent copper, 0.53 percent selenium, 9.36 percent tellurium, 28.33 ounces per ton of silver and 0.18 ounce per ton of gold. Also, the bottom or revert slag, weighing 271 pounds, contained 43.69 percent copper, 1.17 percent selenium, 6.91 percent tellurium, 440.96 ounces per ton silver, and 61.85 ounces per ton gold.

It is significant to note that in my process described in the foregoing, an important step is the treatment with metallic copper of the filtrate resulting from the acid treatment of the first residue (the residue which contains the tellurium and copper in oxide form) which filtrate contains dissolved tellurium and copper in sulfate form. The copper acts as a collector agent for the precious metals and aids in causing these metals and selenium, if present, to collect in the cuprous oxide lower layer of slag in the smelting process. Also it is important to note that even if some selenium is present in the acidic filtrate to which the metallic copper is added, very little selenium is collected in the top or tellurium layer of slag in the smelting operation as the selenium is collected in the cuprous oxide bottom layer of slag.

It will be seen from the foregoing description that the invention provides a method of recovering tellurium from a material containing tellurium, copper, precious metals and/or selenium by a procedural step of smelting a charge of such material with soda or other alkali metal flux at a temperature of about 2200° F. while maintaining a cuprous oxide slag layer as a collector for the copper, precious metals and selenium (if present) beneath another slag layer bearing alkali metal tellurite in an excess of the flux.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In the treatment of anode slimes the method of recovering tellurium therefrom in the form of water soluble tellurite from which elemental tellurium may be recovered which comprises leaching with water a roasted mixture of slimes and sodium carbonate, thereby producing a liquor in which the selenium content of the slimes is dissolved and a residue containing tellurium in oxide form and other metal values is formed, treating said residue with sulfuric acid solution in an amount sufficient to convert all the tellurium to sulfate form thereby producing tellurium in sulfate form which becomes dissolved in acidic solution, separating the acidic liquor containing said tellurium in sulfate form as a filtrate, adding metallic copper to said filtrate in an amount sufficient to precipitate the tellurium thereby forming a copper-tellurium cementation product and a solution of copper sulfate, separating said cementation product from said copper sulfate solution, smelting said cementation product at a temperature sufficient to maintain a fluid bath with a soda flux selected from the class consisting of sodium hydroxide, sodium nitrate, and sodium carbonate thereby forming an upper slag layer containing the tellurium as a water soluble sodium tellurite and substantially free of other metal values and a lower slag layer containing cuprous oxide, and other metal values from said slimes.

2. In a process of treating anode slimes for the recovery of metal values in which the slimes containing selenium, tellurium, copper and other values such as gold and silver are roasted with sodium carbonate to convert selenium to water-soluble form and the roasted product is leached with water to remove the selenium and there is formed a first residue containing tellurium, copper and other metals in oxide form, the method of recovering tellurium in the form of water soluble sodium tellurite from said first residue which comprises treating said first residue with sulfuric acid solution in sufficient amount to convert the tellurium and copper to sulfate and thereby dissolving the tellurium and copper in said solution and also producing a second residue containing other values including gold and silver from said slimes, separating said second residue from said sulfate solution, adding metallic copper to said separated sulfate solution in an amount sufficient to precipitate all of the tellurium thereby producing a precipitate of copper-tellurium cementation product, then smelting the cementation product with a soda flux at a temperature of about 2200° F. sufficient to obtain a fluid bath thereby producing an upper layer of slag containing recoverable tellurium as sodium tellurite, substantially free from selenium and a lower slag layer containing cuprous oxide, and other metal values from said slimes.

3. In the treatment of anode slimes containing selenium and tellurium and precious metal values the method of recovering tellurium therefrom in water soluble sodium tellurite form which comprises treating said slimes to produce a first residue containing tellurium and some copper in oxide form, precious metal values, and substantially free of selenium, treating said first residue with sulfuric acid solution in sufficient amount to convert all tellurium present in said residue to sulfate form and removing undissolved residue therefrom as a second residue and thereby forming a solution containing tellurium sulfate and copper sulfate, adding metallic copper to said solution which contains the tellurium sulfate thereby forming a copper-tellurium cementation product and a copper sulfate solution, separating the copper-tellurium cementation product as a third residue from said sulfate solution, smelting said separated third residue cementation product with sodium carbonate at a temperature sufficient to obtain a fluid bath thereby forming an upper slag layer containing the tellurium as sodium tellurite and substantially free of other metal values and a lower slag layer containing said copper from the cementation product as cuprous oxide and other metal values, if present, from said slimes, and separating said upper slag layer containing the tellurium as sodium tellurite from said lower slag layer containing said copper as cuprous oxide.

4. A method according to claim 3 in which said smelting step is carried out at a temperature about 2200° F.

5. A method according to claim 4 in which the reaction of the added copper in said solution containing tellurium sulfate is carried out while maintaining said solution at about its boiling temperature.

6. In the treatment of anode slimes the method of recovering tellurium therefrom in the form of sodium tellurite which comprises leaching with water a roasted mixture of slimes and sodium carbonate, thereby producing a liquor in which the selenium content of the slimes is dissolved and a residue is formed containing tellurium and other metal values in oxide form, treating said residue with an acid sulfate solution thereby producing tellurium in a sulfate form which becomes dissolved in said acidic solution, separating the acidic liquor containing said tellurium, adding metallic copper to said separated liquor thereby forming a copper-tellurium cementation product and copper sulfate liquor, separating said cementation product from the liquor and smelting said cementation product with an alkali flux capable of forming an upper molten slag layer containing the tellurium as a tellurite and substantially free of other metal values and a lower molten cuprous oxide slag layer containing other metal values from said slimes, said molten cuprous oxide acting as a collector for impurities and other metal values other than tellurium.

7. In the treatment of anode slimes the method of recovering tellurium therefrom in sodium tellurite form which comprises treating roasted slimes in which the tellurium, selenium, and copper contained therein are in water insoluble oxide form, in a manner to form a residue containing tellurium and copper in water insoluble oxide form, and substantially free of selenium, treating said residue with sufficient sulfuric acid solution to convert the tellurium and copper present to sulfate form, separating the sulfate solution from any residue present, then adding sufficient metallic copper to produce a solid copper-tellurium cementation product and a copper sulfate solution, separating the copper-tellurium cementation product and smelting said copper-tellurium cementation product with an excess of sodium carbonate flux capable of forming a molten upper slag layer containing the tellurium in sodium tellurite form substantially free of other metal values and a separate molten lower slag layer beneath said upper layer, said lower slag layer containing copper oxide and other metal values from said slimes and said copper oxide in said lower layer acting as a collector for impurities and metallic values other than tellurium whereby said upper layer is produced substantially free of other metal values than tellurium and then separating said upper slag layer containing said sodium tellurite from said lower slag layer.

8. In a process of recovering tellurium in the form of water soluble sodium tellurite from a residue containing tellurium in water insoluble oxide form, copper in water insoluble oxide form, and minor amounts of selenium in water insoluble oxide form and minor amounts of gold and silver, which comprises treating said residue with sulfuric acid solution in sufficient amount to convert all the tellurium and copper present in oxide form to tellurium sulfate and copper sulfate in acid solution, separating the sulfate solution from any residue remaining, then producing a copper-tellurium cementation residue by adding metallic copper to the sulfate solution, separating out the copper-tellurium cementation residue and smelting said cementation residue with an alkali flux at a temperature about 2200° F. while maintaining a cuprous oxide slag layer as a collector for copper, precious metals and selenium, if present, beneath another slag layer bearing the tellurium as tellurite in an excess of said flux.

9. A method according to claim 8 in which said flux is sodium carbonate.

References Cited in the file of this patent

UNITED STATES PATENTS

| | | |
|---|---|---|
| 509,633 | Tuttle et al. | Nov. 28, 1893 |
| 1,415,526 | Chikashige et al. | May 9, 1922 |
| 2,039,256 | Martin et al. | Apr. 29, 1936 |
| 2,076,738 | Martin et al. | Apr. 13, 1937 |
| 2,084,394 | Heberlein | June 22, 1937 |

OTHER REFERENCES

Schloen et al.: "Journal of Metals," vol. 188, pages 764 to 777, May 1950.